(12) United States Patent
Sato

(10) Patent No.: US 10,823,916 B2
(45) Date of Patent: Nov. 3, 2020

(54) LC-TYPE SIMPLIFIED OPTICAL CONNECTOR

(71) Applicant: SANWA DENKI KOGYO CO., LTD., Tokyo (JP)

(72) Inventor: Takashi Sato, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/556,272

(22) Filed: Aug. 30, 2019

(65) Prior Publication Data

US 2020/0096708 A1    Mar. 26, 2020

(30) Foreign Application Priority Data

Sep. 20, 2018    (JP) ................................. 2018-176326

(51) Int. Cl.
*G02B 6/38* (2006.01)
(52) U.S. Cl.
CPC ......... *G02B 6/3825* (2013.01); *G02B 6/3831* (2013.01)
(58) Field of Classification Search
None
See application file for complete search history.

(56) References Cited

U.S. PATENT DOCUMENTS

| 5,719,977 A * | 2/1998 | Lampert | G02B 6/3831 |
| | | | 385/60 |
| 2017/0219779 A1 * | 8/2017 | Takano | G02B 6/3821 |
| 2017/0315304 A1 * | 11/2017 | Lee | G02B 6/3825 |
| 2017/0363815 A1 * | 12/2017 | Mullert | G02B 6/3893 |
| 2019/0278032 A1 * | 9/2019 | Sato | G02B 6/3825 |

FOREIGN PATENT DOCUMENTS

JP    3329436 B2    9/2002

* cited by examiner

*Primary Examiner* — Michael Stahl
(74) *Attorney, Agent, or Firm* — Bacon & Thomas, PLLC

(57) ABSTRACT

An LC-type simplified optical connector can reduce total length and internal volume of an optical connector, and a space of the optical connector. The LC-type simplified optical connector includes a sleeve with locked piece attached to the other end opening portion of an adapter housing passing through a plug insertion hole inserting an optical plug thereinto from one end opening portion. The sleeve with locked piece includes a locked piece locking a male hook portion of a locking piece protruded from the other end opening portion of the adapter housing. A rear end of a depression portion is provided in a rear end thereof with a female hook portion and in both upper and lower end sides with a pair of stepped stopper portions. A male hook portion locked to the female hook portion is formed in mutually facing inner surfaces in the leading end of the locking piece.

2 Claims, 8 Drawing Sheets

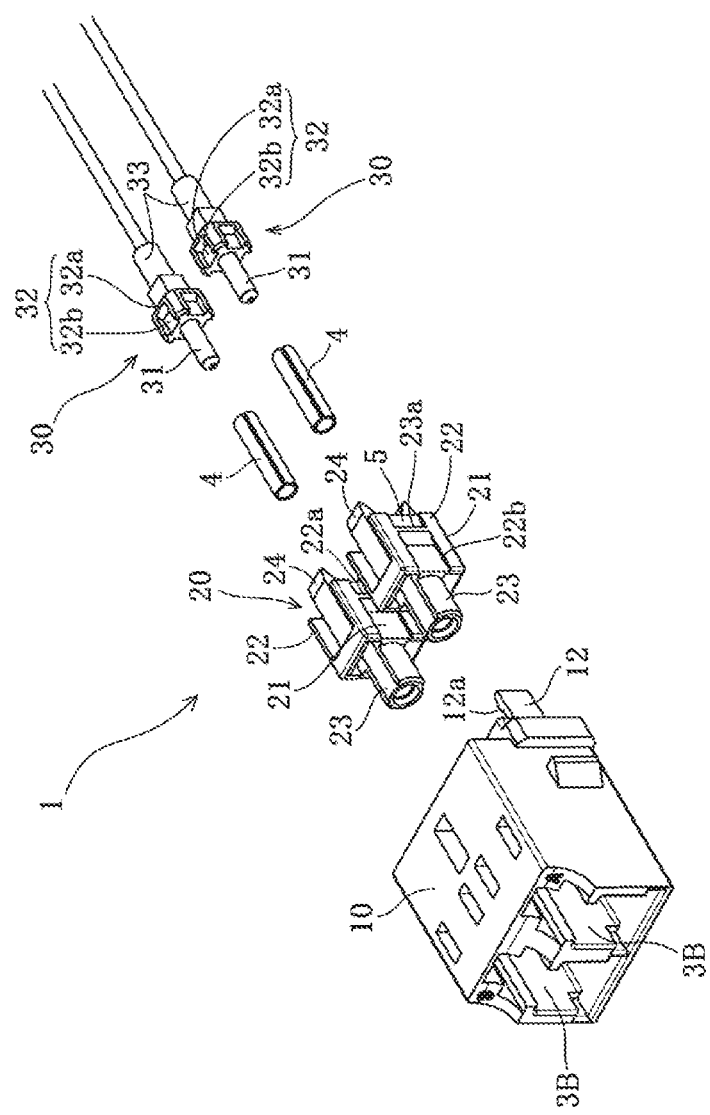

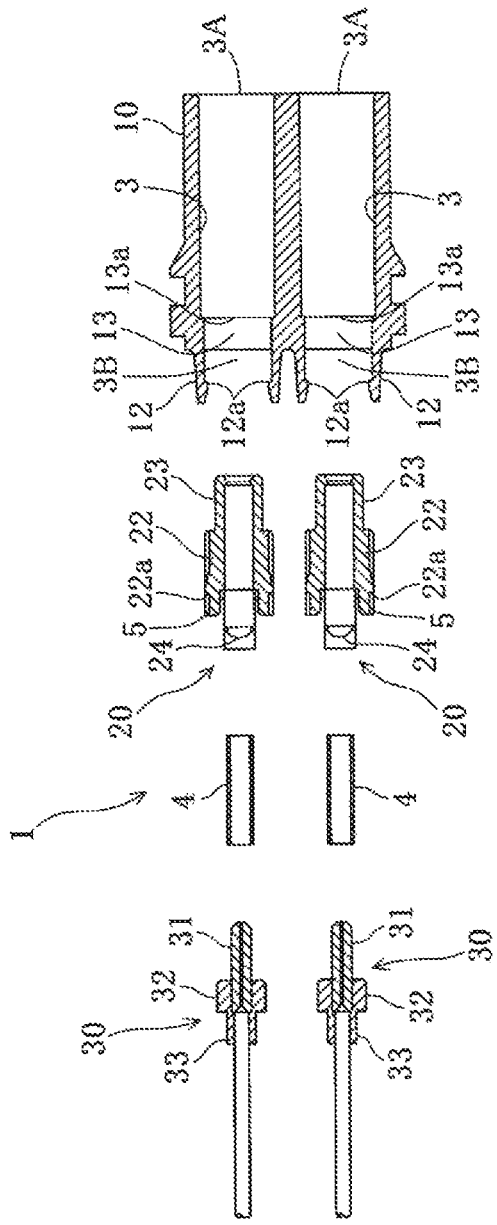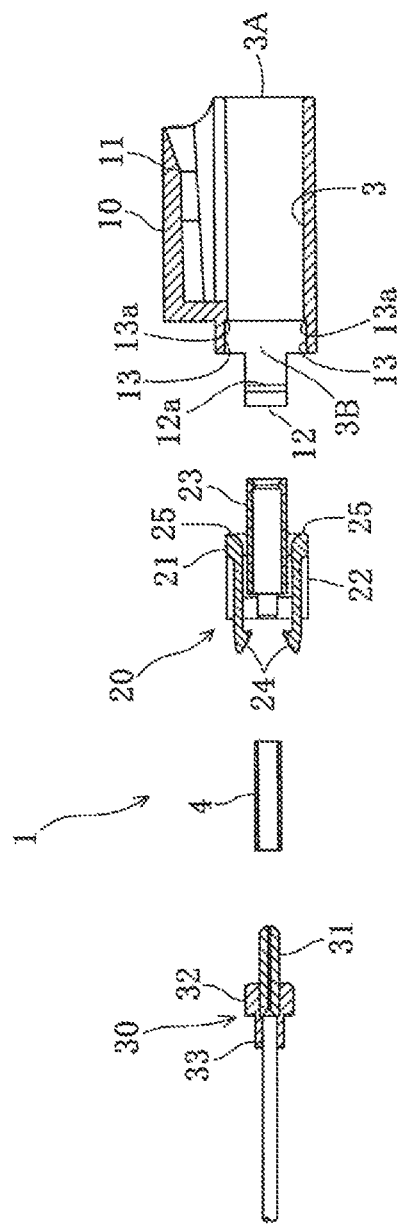

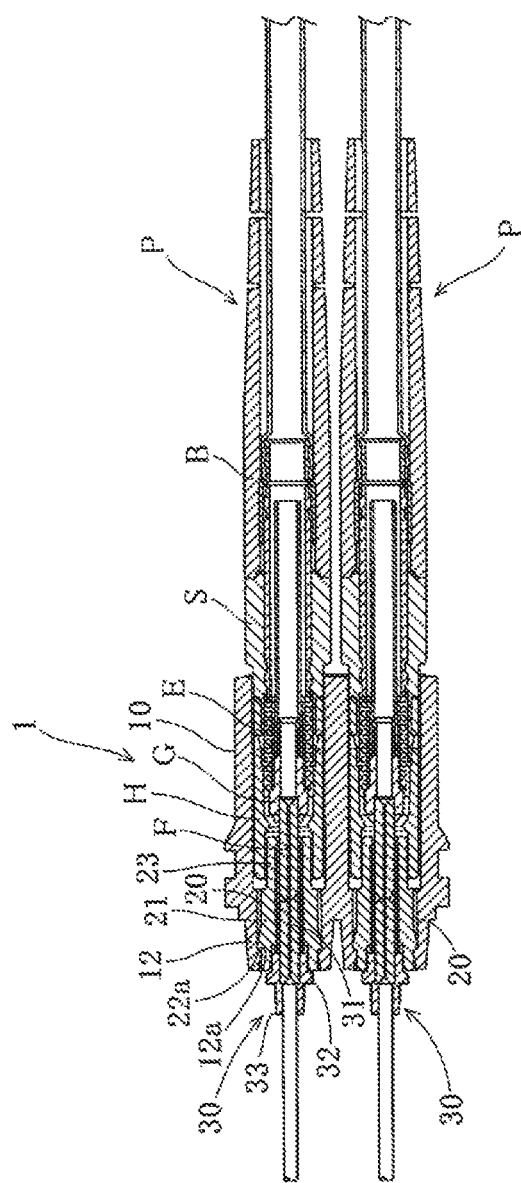
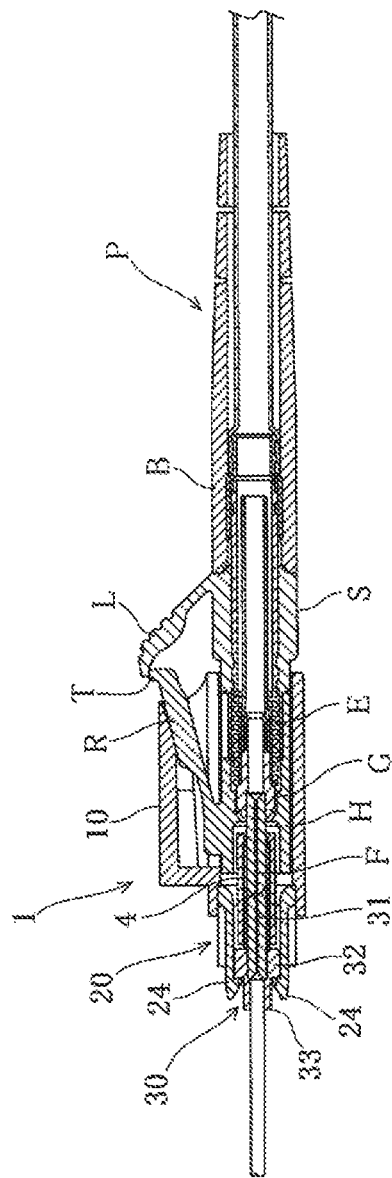
FIG. 7A
FIG. 7B

LC-TYPE SIMPLIFIED OPTICAL CONNECTOR

TECHNICAL FIELD

The present invention relates to an LC-type simplified optical connector which is used as a high-density mounting type optical interface requiring downsizing, simplification and cost reduction.

BACKGROUND ART

Conventionally, as a two-core type optical connector for interconnecting LC-type optical plugs, as shown in FIG. 8, both ends of a polygonal tube shaped adapter housing 100 are provided with one fitting portion A of an optical plug P, and the other fitting portion B of the other optical component such as an optical plug, in such a manner that optic axes thereof coincide with each other.

The adapter housing 100 is structured such that an upper side wall, right and left side walls, a bottom wall and a partition wall are integrally formed and two fitting portions A and A (B and B) are arranged side by side. A pair of right and left joint end walls 101 approximately formed into a U-shaped frame form are arranged at the center of the adapter housing 100. One cylinder is provided in a protruding manner toward the fitting portion A in one of the joint end walls 101, and the other cylinder is formed toward the fitting portion B in the other of the joint end walls 101. A sleeve holder W is formed in a state in which center axes of both the cylinders coincide with each other on the optic axis, and a cylindrical split sleeve is attached to and retained in an inner side of the sleeve holder W.

In the meantime, the optical plug P is provided with a plug housing H, a ferrule holder G which retains at a leading end thereof a ferrule F within the plug housing H, a compression spring E which is attached to an outer peripheral portion in a rear end side of the ferrule holder G, and a stopper S which is fitted to the rear end side of the ferrule holder G via the compression spring E, as shown in FIG. 8. In this state, the ferrule F is retained within the plug housing H so as to be biased in an axial direction via the compression spring E. Further, a rear side of the plug housing H is provided with a boot B which protects an optical fiber core wire and prevents disconnection and the like caused by deformation.

Further, a latch R is integrally provided in the plug housing H, locking projections V are respectively provided in both side surfaces in a width direction approximately at the center portion in an extending direction of the latch R, and the optical plug P engages with a locking groove (not shown) of an adapter housing 100 in the optical connector 1 via the locking projections V (refer to FIG. 1 and FIG. 5B). Further, a trigger lever L is integrally provided in the plug housing H and comes into contact with a projection portion T in a leading end of the latch R from the above direction. The latch R is tilted and the locking projections V are moved away from the locking groove (not shown) by pushing down the trigger lever L, so that the optical plug P can be detached from the adapter housing 100.

Further, there have been conventionally proposed a structure which can securely couple a ferrule and a housing even in an MU-type simplified optical receptacle using a thin ferrule, and an MU-type simplified optical connector structure which has a fixing member to a printed circuit board, as shown in Patent Literature 1. According to these structures, a housing is manufactured by a plastic integral molding, and an inner portion of a ferrule insertion hole is structured such that a left half receives an MU-type optical plug and a right half receives a split sleeve and a sleeve with locking piece inserting a simplified ferrule thereinto.

More specifically, the simplified ferrule can be inserted into a position of the sleeve with locking piece in an innermost portion (an intermediate portion) of the ferrule insertion hole. Further, a locking groove is provided in the housing adjacent to the ferrule insertion hole, and a pair of elastic hook pieces are provided in a side into which the MU-type optical plug is inserted, so as to be integral with the housing. A convex portion protrudes toward the center of the ferrule hole in a leading end of the elastic hook piece, and engages with a locking projection which is formed in a plug housing of the MU-type optical plug.

CITATION LIST

Patent Literature

Patent Literature 1: Japanese Patent No. 3329436

SUMMARY OF THE INVENTION

Technical Problem

However, since the optical connector for interconnecting the LC-type optical plugs shown in FIG. 8 is provided with the adapter housing 100 which inserts the optical plugs P thereinto from both directions, is long and has the great volume, the peripheral equipment and the like (the adjacent LC-type optical plug P and the like) gets in the way, for example, in a case where the optical connector is used as a high-density mounting type optical interface. As a result, there is a fear that any trouble occurs in a plug removing work.

Further, in the case of the patent literature 1 mentioned above, the inner portion of the ferrule insertion hole of the housing is structured such that the left half receives the MU-type optical plug and the right half receives the sleeve with locking piece into which the split sleeve and the simplified ferrule are inserted. Therefore, the simplified ferrule is inserted into the position of the sleeve with locking piece at the innermost portion (the intermediate portion) of the ferrule insertion hole. As a result, the housing itself is long and has a great volume, and a space for the mounting position of the optical connector is increased, for example, in a case where it is used as the high-density mounting type optical interface and the like. Thus, there is a fear that any trouble occurs in the plug removing work.

Consequently, the present invention is made by taking into consideration the conventionally existing circumstances as mentioned above, and an object of the present invention is to provide an LC-type simplified optical connector which can make a total length of an adapter housing short, in addition to combination with a simplified type optical plug, and can reduce an internal volume of the optical connector and a space for a mounting position of the optical connector, for example, in a case where it is used for an input and output interface such as a transceiver device.

Solution to Problem

In order to solve the problem mentioned above, the present invention is characterized in that: the present invention includes an adapter housing which passes through a plug insertion hole inserting an LC-type optical plug along an axial direction from one end opening portion to the other end opening portion, a sleeve with locked piece which is attached to the other end opening portion of the adapter housing, and a simplified type optical plug which is inserted into the sleeve with locked piece via a split sleeve; that the sleeve with locked piece includes a fixing frame portion which is provided with a locked piece for locking a locking piece provided in a protruding manner in the other end opening portion of the adapter housing so as to protrude along the axial direction, and is formed approximately into a U-shaped form in a plan view, a cylindrical sleeve portion which protrudes to both sides while penetrating the fixing frame portion, and a pair of upper and lower elastic locking pieces which are fixed to an inside rear end surface of the locked piece; that the locked piece is provided in each of outside wall surfaces thereof with a depression portion which is formed approximately into a U-shaped concave groove form from a leading end portion toward a rear portion; that a rear end of the depression portion is provided in a rear end thereof with a vertical step shaped female hook portion and in both upper and lower end sides with a pair of horizontal step shaped stopper portions; and that a male hook portion locked to the female hook portion disposed in the locked piece is formed in mutually facing inner surfaces in the leading end of the locking piece.

A vertical distance of the stopper portion has the same length as a vertical width of the locking piece.

Effect of Invention

According to the present invention, it is possible to make a total length of the adapter housing short in addition to combination with the simplified type optical plug, and it is possible to reduce an internal volume of the optical connector and a space for a mounting position of the optical connector in conjunction therewith, for example, in a case where the present invention is used for an input and output interface such as a transceiver device.

More specifically, the present invention includes the adapter housing which passes through the plug insertion hole inserting the LC-type optical plug along the axial direction from one end opening portion to the other end opening portion, the sleeve with locked piece which is attached to the other end opening portion of the adapter housing, and the simplified type optical plug which is inserted into the sleeve with locked piece via the split sleeve; the sleeve with locked piece includes the fixing frame portion which is provided with the locked piece for locking the locking piece provided in a protruding manner in the other end opening portion of the adapter housing so as to protrude along the axial direction, and is formed approximately into the U-shaped form in a plan view, the cylindrical sleeve portion which protrudes to both sides while penetrating the fixing frame portion; and a pair of upper and lower elastic locking pieces which are fixed to the inside rear end surface of the locked piece; the locked piece is provided in each of the outside wall surfaces thereof with the depression portion which is formed approximately into the U-shaped concave groove form from the leading end portion toward the rear portion, the rear end of the depression portion is provided in the rear end thereof with the vertical step shaped female hook portion and in both upper and lower end sides with a pair of horizontal step shaped stopper portions; and the male hook portion locked to the female hook portion disposed in the locked piece is formed in the mutually facing inner surfaces in the leading end of the locking piece. As a result, it is possible to shorten the length in the axial direction of the adapter housing itself and reduce the volume thereof in relation to the conventional type long type adapter housing into which the optical plugs (the LC-type optical plugs, or the LC-type optical plug and the simplified type optical plug) are inserted from both directions.

In short, approximately all of a plurality of locking members have been conventionally covered and protected by the connector housing by making the length in the axial direction of the connector housing long, the locking members retaining the various plugs attached from the front and rear inner ends of the plug insertion hole of the connector housing. On the contrary, in the present invention, it is possible to resolve various disadvantages in conjunction with the exposure of a plurality of locking members by making the length in the axial direction of the connector housing short.

In more detail, since the male hook portion is locked to the female hook portion, it is possible to prevent the sleeve with locked piece attached to the other end opening portion of the adapter housing from removing rearward, and it is also possible to block the vertical movement of the sleeve with locked piece by the upper and lower stopper portions. Further, it is possible to block the movement in the lateral direction by both the right and left locking pieces. Since the sleeve with locked piece can be securely retained by three-point support in the vertical and lateral directions in addition to the rearward direction in relation to the short adapter housing, as mentioned above, it is possible to securely prevent the sleeve with locked piece (including the simplified type optical plug) attached to the other end opening portion of the adapter housing from removing in the vertical and lateral directions and the rearward direction.

Further, since the vertical distance of the stopper portion has the same length as the vertical width of the locking piece, it is possible to prevent the sleeve with locked piece in the other end opening portion of the adapter housing from vibrating in the vertical direction, and it is possible to prevent inconsistency (axis displacement) on the optic axis between the simplified type optical plug and the LC-type optical plug.

BRIEF DESCRIPTION OF DRAWINGS

FIG. 4 is an exploded perspective view of a state viewed from an insertion side of the LC-type optical plug;

FIG. 5A is an exploded horizontal cross sectional view in FIG. 4;

FIG. 5B is a half cross sectional exploded vertical cross sectional view in FIG. 4;

FIGS. 7A and 7B show a state in which an LC-type optical plug is inserted into the LC-type simplified optical connector after being assembled, FIG. 7A being a horizontal cross sectional view and FIG. 7B being a vertical cross sectional view.

DESCRIPTION OF EMBODIMENTS

Figure 1:
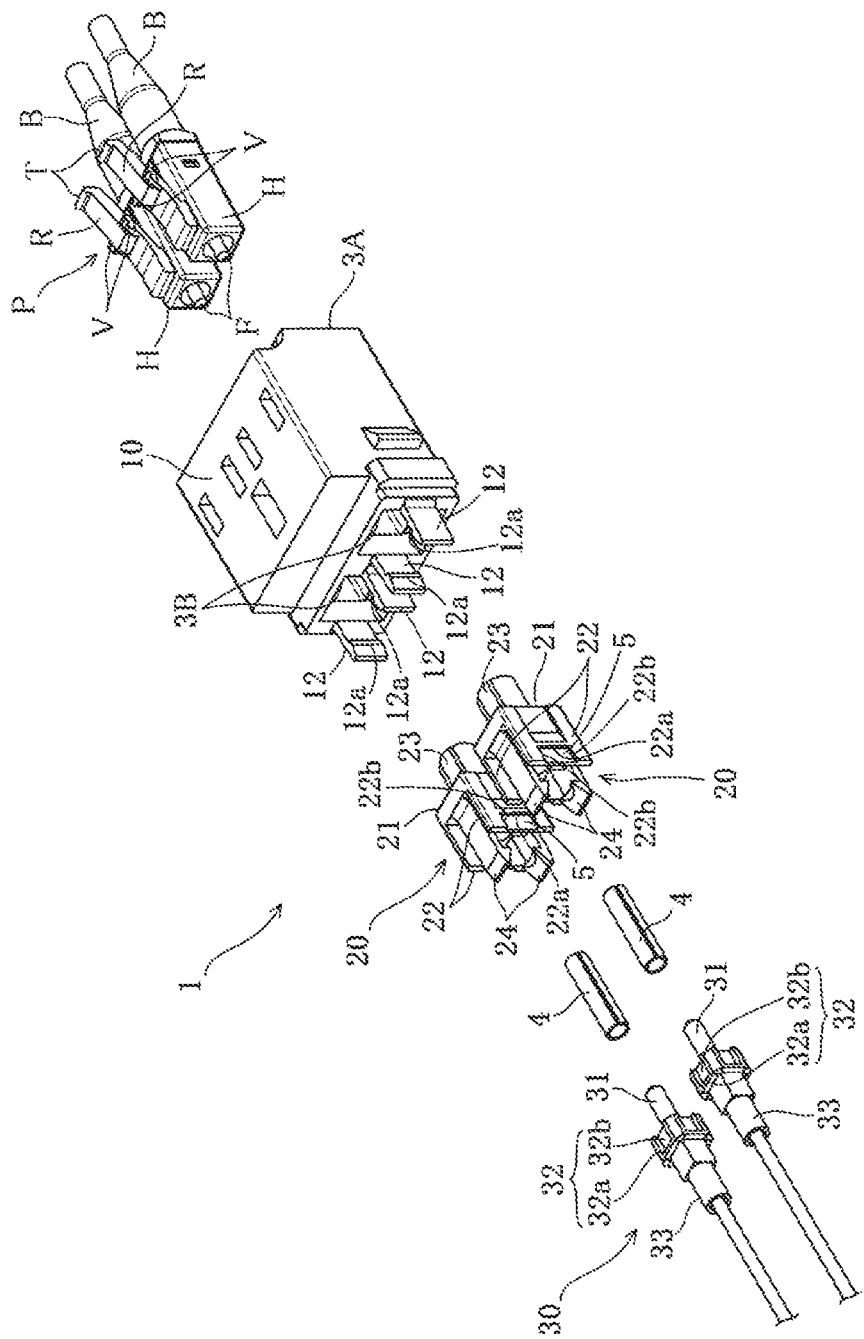
FIG. 1 is an exploded perspective view showing an aspect of an LC-type simplified optical connector carrying out the present invention.

A description will be given below of the present invention with reference to the accompanying drawings. As shown in FIG. 1 to FIG. 7B, an LC-type simplified optical connector 1 according to the present invention is provided with: an adapter housing 10 which passes a pair of right and left plug insertion holes 3 therethrough, the plug insertion holes 3 into which an LC-type optical plug P is inserted along an axial direction from one end opening portion 3A to the other end opening portion 3B; sleeves 20 with locked piece which are respectively attached to the pair of right and left other end opening portions 3B of the adapter housing 10; and a simplified type optical plug 30 which is inserted into each of the sleeves 20 with locked piece via a split sleeve 4.

Figure 8:
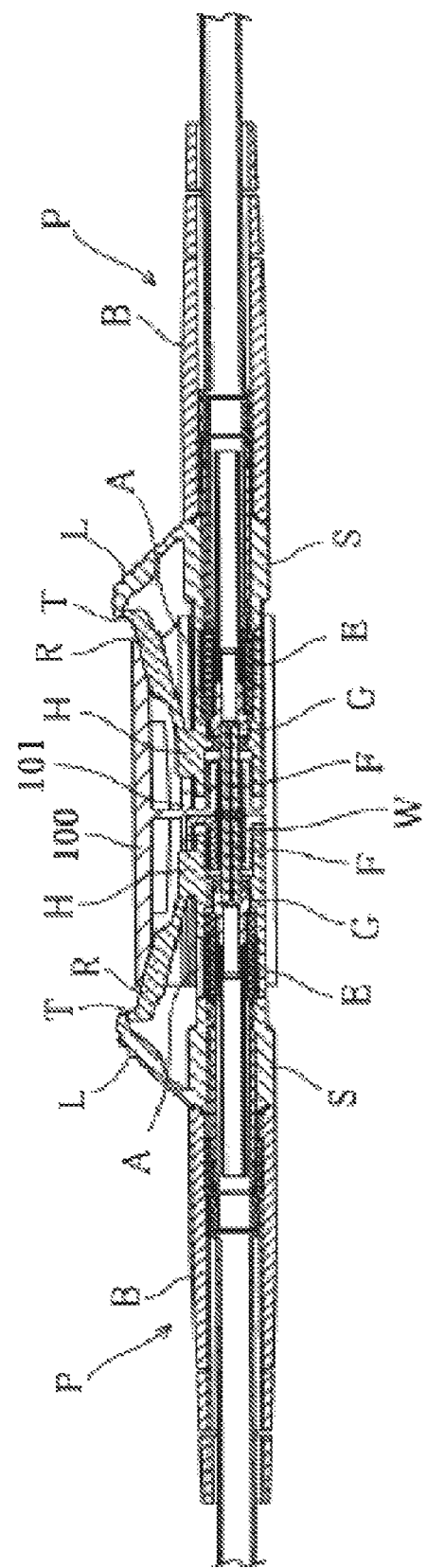
FIG. 8 is a vertical cross sectional view showing a used state of an LC-type simplified optical connector in a conventional example.

In the adapter housing 10 in the present embodiment, only the LC-type optical plug P is inserted into the one end opening portion 3A of the plug insertion hole 3, and the short piece-like sleeve 20 with locked piece and the simplified type optical plug 30 are attached to the other end opening portion 3B of the adapter housing 10. As a result, as shown in FIG. 8, in comparison with the conventional type long type adapter housing 100 into which the LC-type optical plugs P are inserted from both directions, it is possible to shorten the length in the axial direction of the adapter housing 10 itself and reduce the volume thereof in the adaptor housing 10 of the present embodiment.

More specifically, in the adapter housing 10, as shown in FIGS. 1 to 6, an inner portion of the plug insertion hole 3 is formed into a polygonal hole shape for receiving a polygonal tube shaped plug housing H of an LC-type optical plug P mentioned later. On the other hand, locking grooves 11 for engaging locking projections V in both sides of a latch R mentioned later are formed at symmetrical right and left positions in a width direction of an upper wall of one end opening portion 3A into which the LC-type optical plug P is inserted (refer to FIG. 5B). Further, a pair of right and left locking pieces 12 are provided in the other end opening portion 3B of the adapter housing 10 so as to protrude outward along an axial direction each other, the locking pieces 12 being provided with male hook portions 12a in a leading end so as to protrude inward each other and having a spring property. For information, in the present embodiment and the illustrated example, the two-core type adapter housing 10 is described in order to correspond to a two-core LC-type plug P, however, an adapter housing having a single core or four cores or more may be employed.

Further, a pair of locking concave portions 13 are formed at symmetrical upper and lower positions in a side end of the other end opening portion 3B of the adapter housing 10, as shown in FIG. 5B. Further, each of the locking concave portions 13 has a length at which the sleeve 20 with locked piece is attached to a predetermined position from the other end opening portion 3B of the connector housing 10 and stoppers 13a are formed in dead ends of the locking concave portions 13. Upper and lower leading end edge portions 25 of the sleeve 20 with locked piece run into the stoppers 13a and the stoppers 13a block further movement of the sleeve 20 with locked piece.

The sleeve 20 with locked piece is provided with fixing frame portions 21 which are provided with a pair of right and left locked pieces 22 so as to protrude along an axial direction and are formed approximately into a U-shaped form in a plan view, as shown in FIG. 1, FIG. 4, FIG. 5A, and FIG. 6. The locked pieces 22 are provided in each of outer surfaces with a female hook portion 22a for locking a male hook portion 12a of the locking piece 12 which is provided in a protruding manner in the other end opening portion 3B of the adapter housing 10.

Further, a depression portion 5 approximately having a U-shaped concave groove form in a side view is provided in each of outer wall surfaces from a front end, in each of outside wall surfaces of a pair of locked pieces 22 disposed in both right and left sides of the fixing frame portion 21. A female hook portion 22a and stopper portions 22b are formed in a rear end thereof (an insertion side of the simplified type optical plug 30). The female hook portion 22a is formed into a vertical step shape in an axial (front-back) direction. The stopper portions 22b facing each other in both upper and lower ends is formed into a horizontal step shape.

Consequently, the male hook portion 12a of the locking piece 12 is locked to the female hook portion 22a of the locked piece 22, thereby preventing the sleeve 20 with locked piece attached to each of a pair of right and left other end opening portions 3b of the adapter housing 10 from removing rearward. It is possible to prevent the sleeve 20 with locked piece from moving upward and downward with the upper and lower stopper portions 22b, and it is possible to prevent the sleeve 20 with locked piece from moving in the lateral direction with the locking pieces 12 in both right and left sides. In addition, the sleeve 20 with locked piece is attached to the dead end of the locking concave portion 14 which is provided in an end in the other end opening portion 3B side end of the adapter housing 10, and is prevented from moving forward with the stopper 22b provided in the dead end. As mentioned above, the sleeve 20 with locked piece can be securely retained by a so-called three-point support constituted by a support in a lateral direction by means of the locking piece 12, a forward and rearward movement prevention by means of the female hook portion 22a and the stopper 22b, and a vertical movement prevention by means of the upper and lower stopper portions 22b, even if a front portion of the sleeve 20 with locked piece is exposed to a forward side of the adapter housing 10.

Further, the sleeve 20 with locked piece is provided with a cylindrical sleeve portion 23 which protrudes to both sides while penetrating the fixing frame portion 21, and is provided with a pair of upper and lower elastic locking pieces 24 which are arranged at a predetermined distance via the cylindrical sleeve portion 23 in an inside rear end surface of the locked piece 22. The elastic locking pieces 24 are fixed by their rear ends to a rear inner end of the fixing frame portion 21 and protrude their leading ends to a forward side of the locked piece 22.

The sleeve 20 with locked piece is formed into a rectangular tube shape in its side into which the simplified type optical plug 30 is inserted, and the pair of right and left locked pieces 22 are arranged in a positional relationship that the locked pieces 22 are orthogonal to a pair of upper and lower elastic locking pieces 24 in an end surface of the rectangular tube shape.

Figure 2:
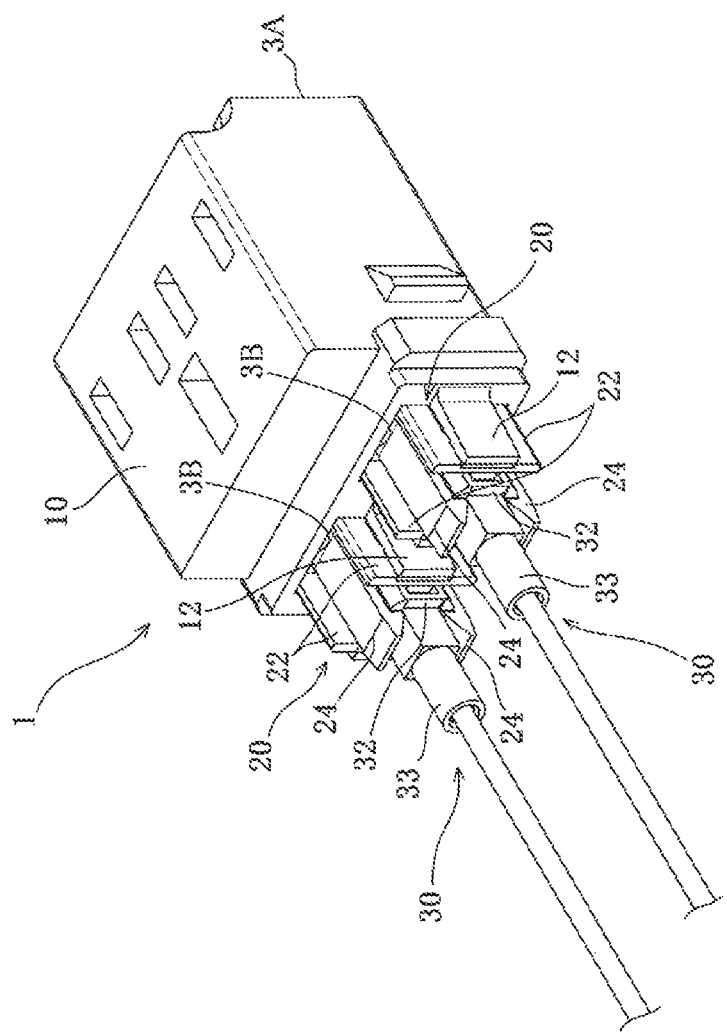
FIG. 2 is a perspective view of the LC-type simplified optical connector after being assembled.
Figure 3:
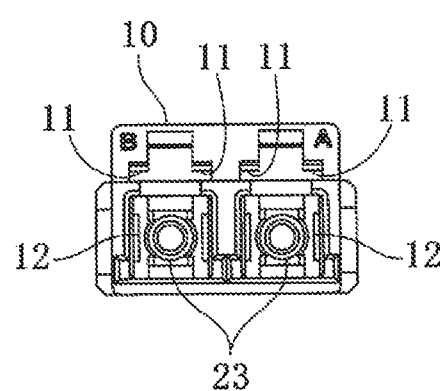
FIG. 3 is a front elevational view of the LC-type simplified optical connector after being assembled.
Figure 6:
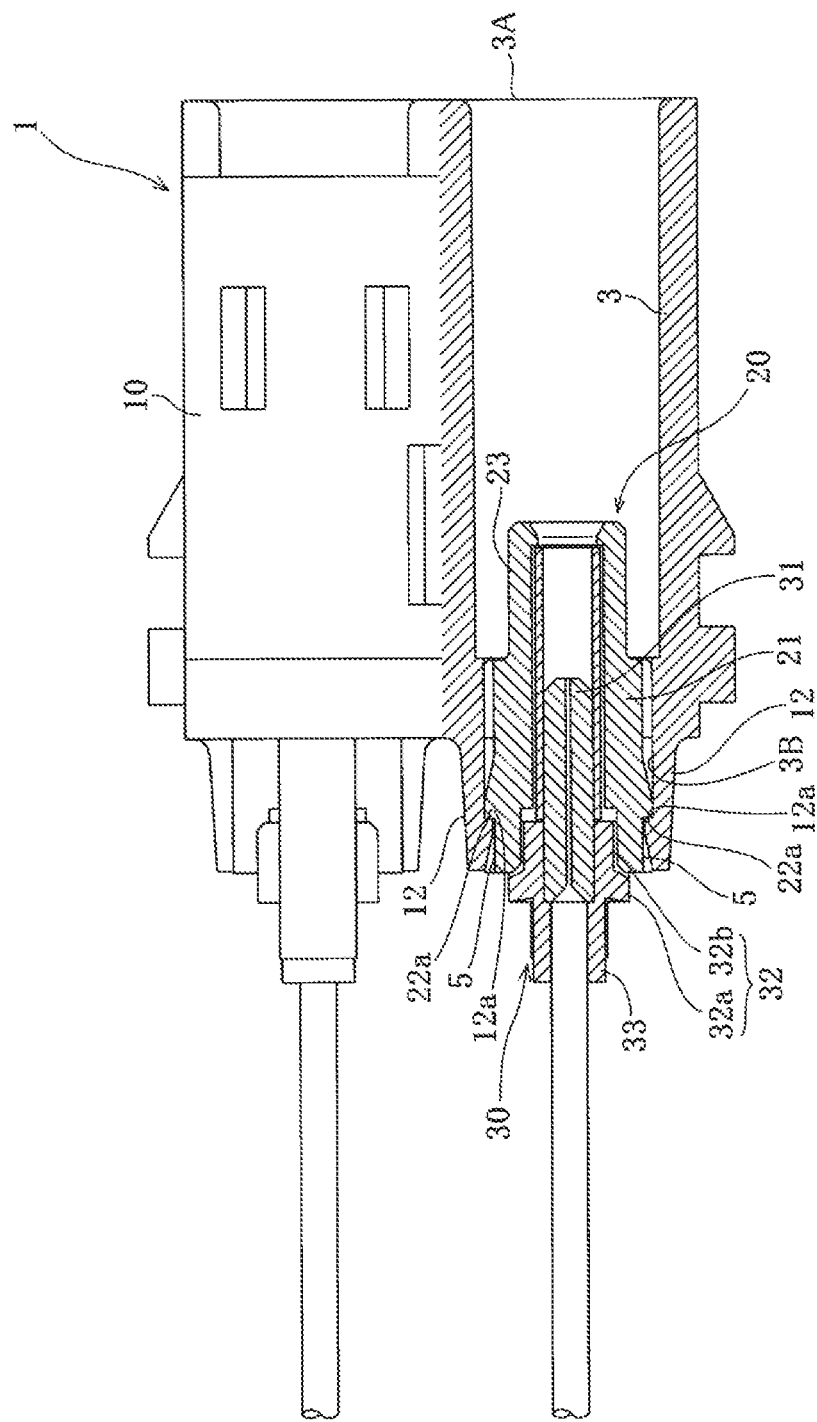
FIG. 6 is a plan view showing the LC-type simplified optical connector after being assembled.

As shown in FIG. 1, FIG. 2, FIG. 4. FIG. 5A, FIG. 5B, and FIG. 6, the simplified type optical plug 30 is constructed by a ferrule 31 which is fixed to an end portion of an optical fiber (not shown), an approximately polygonal tube shaped flange member 32 with a collar portion 32a and a guide groove 32b which receive in a fitting manner the ferrule 31, and a hood 33 which protects the optical fiber and has an elasticity such as a silicone rubber. In the collar portion 32a, four guide grooves 32b penetrating in an axial direction of the ferrule 31 are formed so as to be spaced every 90 degrees in a circumferential direction. The guide groove 32b has a width which can be received in a rectangular tube shaped opening surrounded by a pair of locked pieces 22 of the sleeve 20 with locked piece and a pair of elastic locking pieces 24.

Since the guide grooves 32b are formed so as to be spaced every 90 degrees in the circumferential direction around the optical fiber, the guide grooves 32b are rotationally symmetrical every 90 degrees. As a result, the optical connector 1 according to the present embodiment can be aligned every 90 degrees.

The LC-type optical plug P according to the present embodiment is provided with a plug housing H, a ferrule holder G which retains the ferrule F in a leading end within the plug housing H, a compression spring E which is attached to an outer peripheral portion in a rear end side of the ferrule holder G, and a stopper S which is fitted to the rear end side of the ferrule holder G via the compression spring E, as shown in FIG. 1, FIG. 7A, and FIG. 7B (refer also to FIG. 8 mentioned above about the conventional example). The ferrule F is retained within the plug housing H so as to be biased in an axial direction via the compression spring E. Further, a rear side of the plug housing H is provided with a boot B which protects an optical fiber core wire (not shown) and prevents disconnection due to deformation.

Further, as shown in FIG. 1, FIG. 7A, and FIG. 7B (refer also to FIG. 8 mentioned above about the conventional example), an outer peripheral surface of the plug housing H is provided with a latch R for engaging with and disengaging from the adapter housing 10 so as to be integral with the plug housing H. The latch R is extended in an inclined manner so as to be away from the outer surface of the plug housing H little by little from the leading end portion of the plug housing H toward a rear end portion, and has a projection portion T on a surface of the leading end portion of the latch R, the projection portion T protruding out at a predetermined amount toward an opposite side to the outer surface of the plug housing H. Further, locking projections V are provided respectively in both side surfaces in a width direction of an approximate center portion in an extending direction of the latch R, and the LC-type optical plug P is engaged with the locking groove 11 (refer to FIG. 5B) of the adapter housing 10 in the LC-type simplified optical connector 1 via the locking projection V.

In FIG. 6 (refer also to FIG. 8 mentioned above about the conventional example), a trigger lever L is integrally provided with the plug housing H, and comes into contact with the projection portion T in the leading end of the latch R from the above direction. The latch R is tilted and the locking projection V is moved away from the locking groove 11 by pushing down the trigger lever L, thereby detaching the LC-type optical plug P from the adapter housing 10.

Next, a description will be given of an example of use of the embodiment structured as mentioned above.

First of all, as shown in FIG. 1, FIG. 4, FIG. 5A, and FIG. 5B, the sleeve 20 with locked piece is attached to the other end opening portion 3B of the adapter housing 10. At this time, the male hook portion 12a of the locking piece 12 protruding out of the other end opening portion 3B is engaged with the female hook portion 22a having approximately the U-shaped concave groove form in the side view of the sleeve 20 with locked piece, and the sleeve 20 with locked piece is retained in a state in which the sleeve 20 with locked piece is prevented by the locking piece 12 from coming away in a lateral direction, is prevented by the stopper portion 22b and the female hook portion 22a from coming away in a vertical direction and a rearward direction, and is further prevented by the stopper 13a provided within the other end opening portion 3B of the connector housing 10 from coming away forward.

Next, in a state in which the split sleeve 4 is attached to the leading end side of the ferrule 31 in the simplified type optical plug 30, the split sleeve 4 is inserted into the sleeve 20 with locked piece which is attached to the adapter housing 10. At this time, as shown in FIG. 6, FIG. 7A, and FIG. 7B, the leading end side of the ferrule 31 is inserted together with the split sleeve 4 into the cylindrical sleeve portion 23, and at the same time, a pair of elastic locking pieces 24 of the sleeve 20 with locked piece engage with the collar portion 32a, so that the simplified type optical plug 30 is fixed to the sleeve 20 with locked piece.

Further, as shown in FIGS. 1 and 6, the LC-type optical plug P is inserted into one end opening portion 3A of the adapter housing 10. At this time, at the same time as the locking projection V of the latch R is pushed down by the upper wall surface of the adapter housing 10, the locking projection V is engaged with the locking groove 11 of the adapter housing 10 so as to be retained. In conjunction with this, at the same time as the cylindrical sleeve portion 23 inward fits to the inner side (the cylindrical hole) of the plug housing H, the ferrule F in the leading end of the LC-type optical plug P fits to the inner portion of the cylindrical sleeve portion 23, so that the ferrule 31 protruding forward out of the flange member 32 and the ferrule F of the LC-type optical plug P join within the split sleeve 4 between their leading end surfaces.

In a case where the LC-type optical plug P is detached from the one end opening portion 3A side of the adapter housing 10, the locking projection V is moved away from the locking groove 11 by pushing down with hand the projection portion T in the leading end of the latch R via the trigger lever L which is integrally provided in the plug housing H, so that the LC-type optical plug P can be easily pulled out.

The invention claimed is:

1. An LC-type simplified optical connector including:
   an adapter housing which passes through a plug insertion hole inserting an LC-type optical plug along an axial direction from one end opening portion to the other end opening portion;
   a sleeve with locked piece which is attached to the other end opening portion of the adapter housing; and
   an optical plug having a first end part which is inserted into the sleeve with locked piece via a split sleeve, and a second end part which is fixable to an end portion of an optical fiber,
   wherein the sleeve with locked piece includes a fixing frame portion which is provided with a locked piece for locking a locking piece provided in a protruding manner in the other end opening portion of the adapter housing so as to protrude along the axial direction, and is formed approximately into a U-shaped form in a plan view, a cylindrical sleeve portion which protrudes to both sides while penetrating the fixing frame portion, and a pair of upper and lower elastic locking pieces which are fixed to an inside rear end surface of the locked piece,
   wherein the locked piece is provided in each of outside wall surfaces thereof with a depression portion which is formed approximately into a U-shaped concave groove form from a leading end portion toward a rear portion,
   wherein a rear end of the depression portion is provided in a rear end thereof with a vertical step shaped female hook portion and in both upper and lower end sides with a pair of horizontal step shaped stopper portions, and wherein a male hook portion locked to the female hook portion disposed in the locked piece is formed in mutually facing inner surfaces in the leading end of the locking piece.

2. The LC-type simplified optical connector according to claim 1, wherein a vertical distance between the stopper portions has the same length as a vertical width of the locking piece.

* * * * *